May 25, 1954
S. GUNTHORP
2,679,305
STRUCTURAL JOINT
Filed Nov. 18, 1950
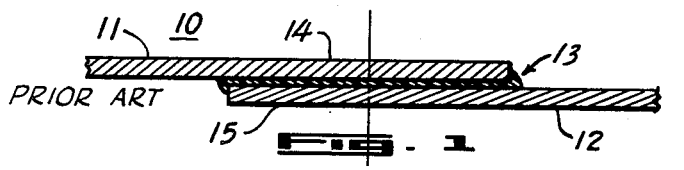
PRIOR ART FIG. 1
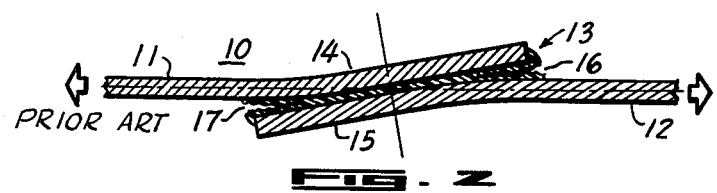
PRIOR ART FIG. 2
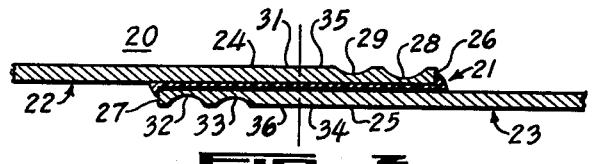
FIG. 3
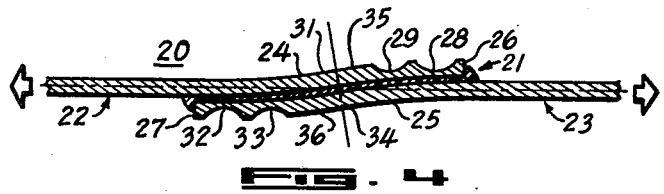
FIG. 4
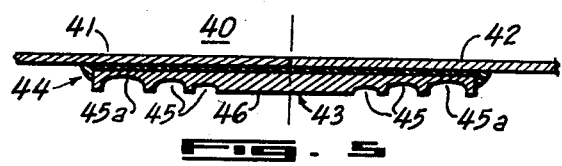
FIG. 5
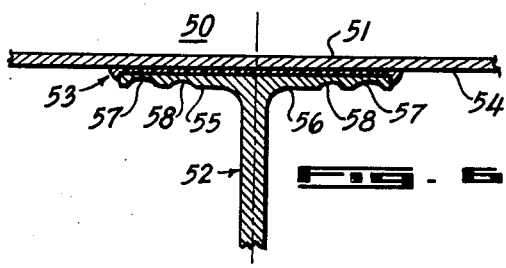
FIG. 6
INVENTOR.
Seth Gunthorp
BY
Walter J. Jason
ATTORNEY Patented May 25, 1954

2,679,305

UNITED STATES PATENT OFFICE 2,679,305

STRUCTURAL JOINT

Seth Gunthorp, Coronado, Calif., assignor to Consolidated Vultee Aircraft Corporation, San Diego, Calif., a corporation of Delaware Application November 18, 1950, Serial No. 196,493

8 Claims. (Cl. 189—36)

This invention relates generally to the art of uniting metallic members and more particularly to an improved structural joint.

An object of the present invention is to provide an improved form of structural joint between lapped surfaces of metallic members having a unique construction whereby it will withstand forces which are sufficient to seriously deform or rupture the metallic member.

Another object of the invention resides in providing an improved joint between lapped surfaces of metallic members constructed in a novel manner such that the tensile stresses throughout the bonded area of the joint are substantially uniform.

Another object of the invention lies in so forming the metallic members to be joined that these members will bend more readily and easily in the areas which are joined and thereby reduce stress concentrations at the joint.

A further object of the invention is the formation at the areas which are joined of a series of notches or grooves whereby the metallic members will more readily bend in these areas to prevent a rupturing force being developed at the joint.

Other objects and features of the present invention will be readily apparent to those skilled in the art from the following specification and appended drawings wherein is illustrated a preferred form of the invention, and in which:

Figure 1 is a sectional view of a composite structure known in the prior art wherein the elements are connected by a joint of usual construction.

Figure 2 illustrates the elements of Figure 1 and the effect of tensile forces on the joint of Figure 1.

Figure 3 is a sectional view of a lap joint between the faying surfaces of two metallic members embodying the present invention.

Figure 4 is a view showing the effect of tensile forces on the lap joint of Figure 3.

Figure 5 is a sectional view of a composite article employing a joint formed in accordance with the present invention.

Figure 6 is a sectional view of a relatively thin metallic sheet having a reinforcing member secured thereto by a joint embodying the present invention.

Referring in greater particularity now to the drawings Figures 1 and 2 illustrate a conventional composite structure, indicated generally by the numeral 10, which comprises a metallic member 11 in overlapping relationship with and connected to a second metallic member 12 by a joint 13. The end portions of members 11 and 12 which are overlapped and joined one to the other are indicated respectively by the numerals 14 and 15. The joint 13 may be prepared in any conventional manner such as by the use of adhesives commonly employed for adhering one metallic surface to another. It is understood that composite structure 10 is to be considered as representative of those prior art structures having two metal parts with the same general or mating surface contours at least in the areas where a bonded connection is to be effected. To provide for strength in the connection between members 11 and 12 of composite structure 10 adhesion should be effected over a relatively large area and therefore the two members 11 and 12 should be positioned in overlapping relationship an amount sufficient to afford a relatively large area of contact.

The amount of overlap required is determined by gauge and modulus of elasticity of the bonded materials. The greater the gauge the greater must be the overlap for optimum joint efficiency. It is merely a matter of experience to determine the optimum amount of overlap.

When a composite structure 10 joined together as shown in Figure 1 is subjected to loads, the directions of which are indicated by arrows, it has been found that a bending action occurs at the joined ends 14 and 15 of the members 11 and 12. The end portions continue to deflect until the lines of action of the applied loads coincide, in which situation they also pass through the center-line of the joint. End portions 14 and 15, as can be seen from the drawings, have straight unrelieved surfaces and will resist bending throughout the areas which are joined. Consequently there will be a movement of the outer ends of members 11 and 12 away from the surfaces to which they were adhered. As a result of this movement a very large tension force will be applied at the edges of the members 11 and 12. This tension force will have the effect of tearing the joint 13 as shown at 16 and 17 and results in a failure of the connection.

Figure 3 illustrates a composite structure 20 embodying a joint constructed in accordance with the present invention wherein stress concentrations at the edges of overlapped portions of two parts to be joined are substantially reduced. This joint construction is indicated generally by the numeral 21 and serves to connect metallic members 22 and 23. As shown the metallic members 22 and 23 are flat and lie with their respective end portions 24 and 25 in overlapping relationship. It is understood that these members are to be considered as merely representative of members that may constitute a composite structure and that they need not be flat providing they embody or include surfaces having similar contours which could be mated, so that one member can be secured to the other.

The present invention involves working the end portions 24 and 25 of members 22 and 23 in such a manner that they will readily bend in the areas that are joined. This ability to readily deflect will prevent separation or a movement apart at the edges of the members.

To enable the ends, or overlapping portions 24 and 25 to bend or deflect readily upon the application of load to the structure, a plurality of notches or grooves are provided on each of the metallic members 22 and 23 on the outer surfaces of the ends 24 and 25, and lying substantially parallel to the transverse edges 26 and 27, respectively, thereof. In the composite article 20 of Figure 3 a pair of transverse notches or grooves 28 and 29 are formed, in any suitable manner such as by milling or machining, in the outer surface 31 of end portion 24 of metallic member 22, and similarly a pair of grooves 32 and 33 are afforded on the opposite metallic member 23 in the outer surface 34 of its end portion 25. These grooves will run the entire length of the joined areas. It is preferred that the outwardly opening notches or grooves 28 and 29 formed in member 22 be both positioned at the same side of the vertical center-line through the joint in that portion of the joint, indicated generally at 35, which lies between the center-line of the joint and the edge 26. Grooves 32 and 33, likewise, are grouped on their member 23 to one side of the center-line, in the area generally indicated at 36 which extends between the center-line and the edge 27 of the member 23. It is noted, as is illustrated in Figures 3 and 4, that this construction positions the pair of grooves 28 and 29 on the side of the center-line opposite to that occupied by the pair of grooves 32 and 33. Attention is particularly directed to the fact that one of the grooves in each pair is deeper than the other, with the deeper of the two grooves being that which lies closer to the edge of the metallic member. Thus grooves 28 and 32, which lie nearer the edges 26 and 27 of their respective members 22 and 23 than do grooves 29 and 33, are the deeper grooves. These deeper grooves 28 and 32 are thus located because the largest peel forces or separation stresses are present at the edges, which condition requires therefore that maximum flexibility be afforded in the area adjacent the edges to counteract these stresses. The shallower grooves 29 and 33 are provided also to counteract stresses applied to the joint and to allow bending to occur in the stressed area between the deeper grooves and the center-line. Figure 4 illustrates the appearance of the overlapped joined areas after the application of load to the composite article 20. It is noted that the outer edges 26 and 27, respectively, of the members 22 and 23 have not moved away from the adjacent metallic member but rather that the grooved portions 35 and 36 of the members 22 and 23 on both sides of the center-line of the joint have been deflected under the tensile forces applied thus serving to maintain the bond throughout the area of overlap. Affording a construction to the joint 21 whereby the areas stressed will readily bend under the applied load in the direction of the adjacent member will result in there being substantially uniform stresses in the metal underlying the grooved portions. There will be no undue stress concentration at the edges of the members and therefore any tendency to the development of a peeling action is substantially completely nullified.

While the composite article 20 has been described with two grooves formed in each of the two members 22 and 23 it is to be understood that the invention is not to be limited to the use of a particular number of grooves. The number of grooves utilized is determined by the thickness of the metallic members to be joined. It is granted that a gauge might be employed which would require no grooving in the surface of the metal to afford ready bending, such as where the metallic members are of foil thickness, or of a dimension wherein ready bending, even under relatively minor loads, is an inherent characteristic. However in aircraft, automobile and various other forms of manufacturing the usual structural members, for strength and rigidity, employ metals of a gauge which, while they will bend, will normally have a tendency to resist bending at the ends to be joined and therefore a situation such as illustrated in Figure 2 will have a tendency to arise. The present invention is therefore contemplated for use with those structural metals having a gauge which is sufficiently great so as normally to provide relatively great resistance to bending at their ends.

While the number of grooves formed is not to be restricted to two grooves in each member it is preferred that there be at least two grooves in a group, this to insure that deflection is secured throughout the bonded area and therefore that the tensile stresses in this area be substantially uniform. A greater number of grooves than two is a matter of the relative gauge of the metallic parts being joined. Only that number of grooves will be employed which will sufficiently weaken the metallic member in the area of the bond so that the end portion deflects under load in a manner that prevents peeling.

The depth of the grooves provided in each of the members to be joined must be a sufficient amount that the desired bending action throughout the bonded area is obtained. It has been found that if the deeper groove of two penetrates over one-half to three-quarters of the way through the metal and the other groove has a depth of one-quarter to about one-half of the thickness of the metal part that a desirable flexibility is usually afforded. If more grooves than two are provided to a member the depth to which the additional grooves penetrate the metal will be less than that of the others which lie closer to the edge of the metal. The grooves provided therefore on a member shall become shallower as they are located further from the edge of the metallic member. By making the grooves progressively shallower uniform stress in the metal underlying the grooves is substantially secured.

It has been found that the distance between grooves is not critical. The distance of the first groove from the edge should be kept small, preferably in the neighborhood of $\frac{1}{16}''$. The desired flexibility was obtained when the first groove was variously located $\frac{1}{16}''$ to $\frac{1}{8}''$ from the edge and when the distance between the center-lines of grooves was varied between $\frac{1}{8}''$ to $\frac{1}{4}''$. The width of a groove could also vary, satisfactory joints have been effected where the width of the grooves has been varied between ⅛" and 3/16". While specific figures have been recited as illustrative of the spacing of the grooves and of their widths it is understood that variations may occur in these, but the invention does not contemplate any spacing or width of grooves which does not afford the end portions of the connected members sufficient flexibility so that they will bend in the direction of the opposing member under the applied loads.

The joint construction of the present invention is adapted for use with such conventional methods of fastening one metallic member to another as brazing, soldering or adhesive bonding. In each of these joining methods the applied load will act in a similar manner. There will be unbalanced stress concentrations with the maximum stress concentration being present at the edges of the metallic parts so that a peeling action may arise to effect failure of the joint. In each instance grooving or notching the metallic parts to be joined in the manner above described results in a very large reduction of the stress concentration at the edges, renders the tensile stress at the joint substantially uniform throughout the bonded area, and nullifies any tendency to a peeling action. When composite articles utilizing the joint of the present invention have been subjected to extreme loads it has been found that the failure will have the tendency not to occur at the joint but rather in the metal itself.

Where adhesive bonding is employed the invention contemplates the use of any commercially available polymerizable bonding composition which is capable of adhering to metal and will produce a strong bond between metal and metal. The adhesive may be thermoplastic or thermosetting dependent upon the ultimate loads and conditions of use the composite article will be subjected to in the particular use for which it is intended. Somewhat higher strengths are obtainable with thermosetting adhesives and the latter adhesives can withstand elevated temperatures.

Any suitable metal adhering natural or synthetic thermoplastic adhesive may be used. The vinyl resins are particularly desirable. Among the suitable vinyl resins are vinyl chloride-acetate copolymers and the polyvinyl acetal resins, such as vinyl butyral polymers.

Thermosetting adhesives contemplated are the modified phenol-formaldehyde polymers. These polymers include nylon, such as the alcohol soluble synthetic linear polyamides, combined with a compatible phenol-formaldehyde resin. Also included are soluble reactive phenol-formaldehyde resins modified with a synthetic rubber, such as neoprene (an emulsion polymer of chloroprene), or with a synthetic rubber of the butadiene 1,3 acrylic nitrile copolymer type. These synthetic rubber-base thermosetting resins of the mixed type have excellent metal adhering properties. They are commonly known as phenolic-elastomers and are readily commercially available from manufacturers such as Cycleweld Div., Chrysler Corp.; Resinous Products and Chemical Co.; U. S. Stoneware Co.; or Narmco, Inc.

Another particularly satisfactory synthetic resin thermosetting adhesive is afforded by the bis-phenol epichlorohydrin condensation polymers modified by the addition of polymerizing agents, such as hexamethylene-diamine, melamine, or urea-formaldehyde. This resin is available under the trade-mark "Epon" and is manufactured by Shell Chemical Corp. Epon adhesives effect a bond having exceptionaly high strength and are very readily adhered to the metallic surfaces to be joined.

The particular method of applying the adhesive, and the pressures and temperatures involved form no part of the present invention. It is assumed that good bonding practice will be followed. The present invention is concerned only with effecting a stronger joint than is possible by the use alone of the usual fastening methods, such as brazing, soldering or adhesive bonding of metallic members without treatment of the areas being bonded to render them flexible.

Figure 5 illustrates a composite structure wherein it is desired that a smooth, unbroken flush surface be presented at one side. In such a construction, generally indicated as a whole by the numeral 40, two sheet metal members 41 and 42 are positioned with their ends in abutting relationship and a third metallic member 43 is secured at one side of the members 41 and 42, extending substantially an equal amount to either side of the abutting edges of the members 41 and 42. The third member 43 may be fastened through a structural joint 44 to its associated members 41 and 42 by the conventional methods above mentioned, that is, by brazing, soldering or adhesive bonding. As shown, a plurality of grooves 45 are formed in the outer surface 46 of member 43. In this embodiment three grooves have been utilized on either side of the vertical center-line through the joint. It is noted that the deepest grooves 45a are provided adjacent the extremities of member 43, and the grooves are made successively shallower as they approach the center-line of the bonded areas. Again as in the first joint construction hereinbefore described the grooves serve to weaken the ends of the interconnecting member 43 and render them flexible so that they can readily bend under the load applied to the composite article, thus substantially reducing the stress concentrations at the edges of member 43 and virtually nullifying any tendency to a peeling action.

Another variant is illustrated in Figure 6 wherein one member is secured to another for the purpose of providing greater strength and rigidity to the composite member, indicated generally by the numeral 50. This embodiment comprises a relatively thin sheet metal member 51 which it is assumed forms the skin of an airfoil section and which is subjected to loads which have a tendency to buckle it. A load carrying stiffener or reinforcing T-shaped member 52 is secured by a structural joint 53 to the interior face 54 of skin 51 by usual bonding methods. Each flange 55 and 56 of T-shaped member 52 has a pair of grooves 57 and 58 formed in the under surface thereof. It is noted that again grooves are afforded on opposite sides of the center-line of the joint, with the deeper grooves 57 provided nearer the outer edges than the companion groove of the pair. Grooves 57 and 58 will permit the ends of the flanges 55 and 56 to bend readily under the load applied to the skin 51 to take up the stresses without destroying the connection between the reinforcing member 52 and skin 51. The grooves again serve to minimize the effects of stress concentrations at the edges of the bonded area to prevent the peeling or separation of the bonded joint.

It will thus be seen that this invention affords an improved joint construction particularly adapted for the fabrication of structural members. The resultant structural members are much more satisfactory than those employing conventional constructions. The joint effected has unusually great strength and reliability and is readily and economically obtained.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A structural joint including a plurality of metallic members having lapped surfaces, a bonded connection between said metallic members at said lapped surfaces, and a plurality of outwardly opening transverse grooves formed in the outer surfaces of the metallic members over the bonded area thereof and located on each side of the center of said connected lapped surfaces, whereby bending on the application of tension loads may readily occur at the bonded area.

2. A structural joint including a plurality of metallic members having lapped surfaces, a bonded connection between said metallic members at said lapped surfaces, and a plurality of outwardly opening transverse grooves formed in the outer surfaces of the metallic members over the bonded area thereof and located on each side of the center of said connected lapped surfaces, whereby bending on the application of tension loads may readily occur at the bonded area, said grooves located at each side of said center being of varying depths with the grooves being succeedingly deeper the farther spaced they are from said center.

3. A structural joint including a plurality of metallic members having lapped surfaces, a bonded connection formed of a metal adherent polymerizable adhesive securing said lapped surfaces together, and a plurality of outwardly opening transverse grooves formed in the outer surface of the portions of said metallic members overlying the area of the bonded lapped surfaces to afford ready bending at said bonded area, at least two grooves being located on each side of the center of said connected lapped surfaces and being of different depths, with the grooves farthest spaced from said center being deeper than the others.

4. A structural joint for a pair of overlapping metallic members comprising a bonded connection between the lapped surfaces of said metallic members, and a plurality of transverse grooves formed in the outer surface of each of said pair of overlapping metallic members at the overlapped portions thereof to afford ready bending of the metallic members at said bonded lapped surfaces on the application of a tension load, said grooves in the outer surface of each of said metallic members being located between a center-line through the bonded area and the transverse edges of the metallic members.

5. A joint between overlapping portions of two metallic members comprising a bonded connection formed of a heat-sensitive synthetic resin adhesive between said overlapped portions, and at least two transverse grooves formed in the outer surface of each of said metallic members at the overlapped portions thereof to afford ready bending of said metallic members at the bonded area thereof on the application of a tension load, said grooves on each member being located between the transverse edge thereof and a center-line through the bonded area and being of varying depths, the grooves on said members which are farthest from said center-line being of greater depth than the other grooves.

6. In a structural joint, a pair of sheet metal members having adjacent edge portions, a metallic member positioned at one side of said sheet metal members across said adjacent edge portions, a bonded connection between the portions of the surfaces of said sheet metal members and the metallic member which are contiguous, and at least two grooves formed in the outer surface of said metallic member on each side of the center of said metallic member to afford ready bending of said metallic member, said grooves on each side of said center being of different depths with the deepest groove being farthest spaced from said center.

7. In a structural joint, a pair of sheet metal members having adjacent edge portions, a metallic member positioned at one side of said sheet metal members across said adjacent edge portions, a bonded connection formed of a metal adherent polymerizable adhesive between the portions of the surfaces of said sheet metal members and the metallic member which are contiguous, and at least two grooves formed in the outer surface of said metallic member on each side of the center of said metallic member to afford ready bending of said metallic member, said grooves on each side of said center being of different depths with the deepest groove being farthest spaced from said center.

8. A structural joint between a sheet metal member of relatively thin gauge and a metallic reinforcing member overlying a relatively restricted area of the surface of said sheet metal member comprising a bonded connection between the faying surfaces of said sheet metal member and said metallic member, and at least two transverse grooves formed in the outer surface of said metallic reinforcing member on each side of the center thereof to afford ready bending of said metallic member, said grooves on each side of said center being of different depths with the deepest groove being farthest spaced from said center.

References Cited in the file of this patent

UNITED STATES PATENTS

| Number | Name | Date |
|---|---|---|
| 1,290,091 | Cole | Jan. 7, 1919 |
| 1,812,151 | Jacocks | June 30, 1931 |
| 1,933,279 | Quarnstrom | Oct. 31, 1933 |
| 2,048,895 | Rosen | July 28, 1936 |
| 2,121,988 | Salfisberg | June 28, 1938 |
| 2,335,153 | Lauck | Nov. 23, 1943 |
| 2,551,299 | Sowa | May 1, 1951 |

FOREIGN PATENTS

| Number | Country | Date |
|---|---|---|
| 510,488 | Great Britain | of 1939 |
| 122,730 | Australia | Nov. 21, 1946 |